United States Patent Office 2,860,045
Patented Nov. 11, 1958

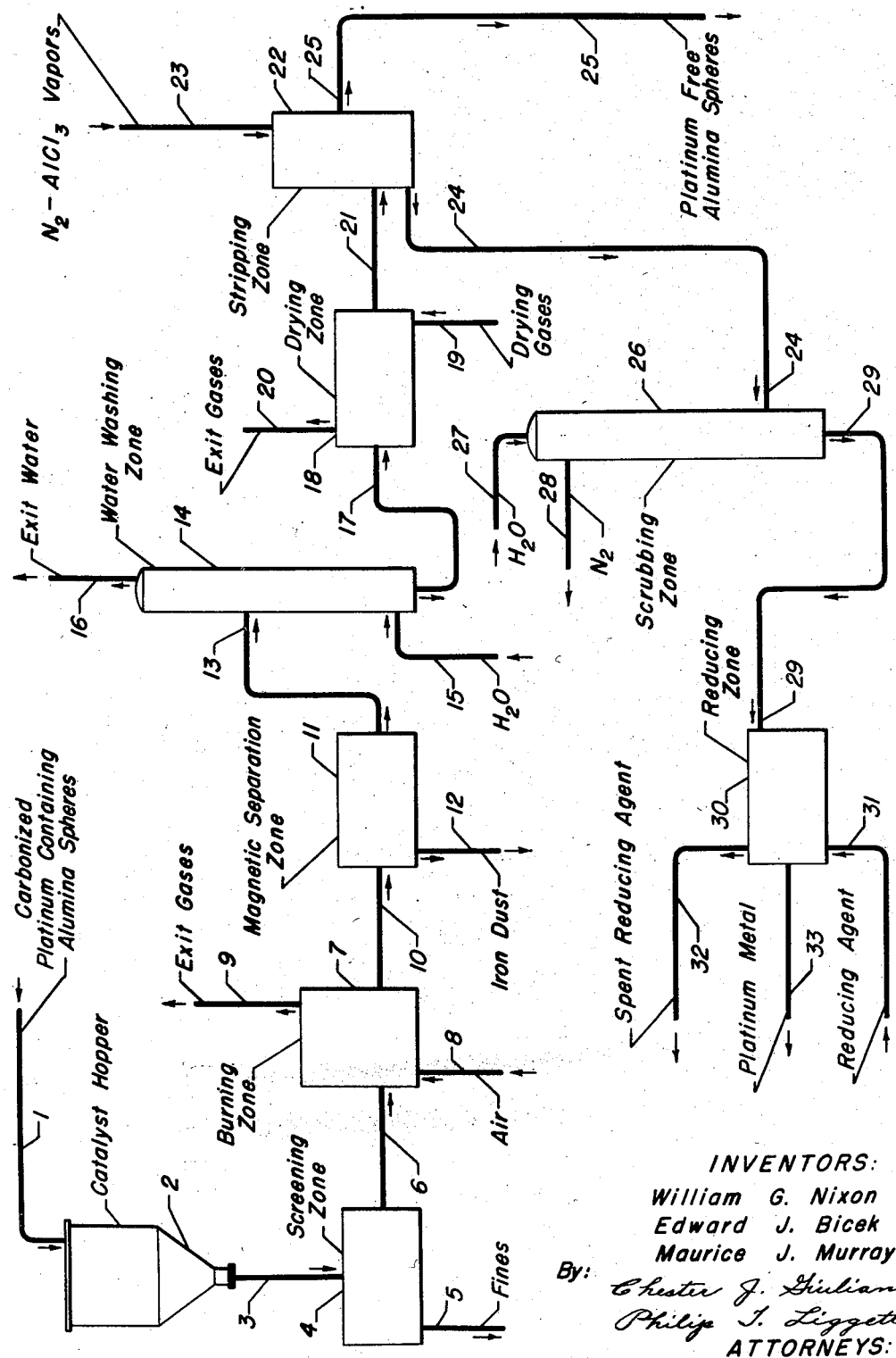

2,860,045

METHOD OF REMOVING PLATINUM FROM A COMPOSITE CONTAINING PLATINUM AND ALUMINA

William G. Nixon, Westchester, Edward J. Bicek, La Grange, and Maurice J. Murray, Palatine, Ill., assignors to Universal Oil Products Company, Des Plaines, Ill., a corporation of Delaware Application July 25, 1955, Serial No. 524,038

5 Claims. (Cl. 75—83)

This invention relates to a process for recovering metals from metal-containing composites. The invention more particularly relates to a process for removing a platinum group metal from a composite in which a platinum group metal is associated with a metal oxide. The invention still more particularly relates to a process for removing platinum from a spent catalyst containing platinum and a refractory inorganic metal oxide.

Many methods have been devised to recover noble metals from catalytic composites, most of which are unsatisfactory because of their expense and extreme complexity. Present methods usually require that the carrying medium, that is the support for the noble metal, be dissolved leaving a solid material which comprises the catalytic noble metal and all other materials insoluble in the dissolving medium. The main difficulties with these usual methods are that they require the digestion of large quantities of carrying material in order to recover extremely small amounts of expensive metals and the material recovered after the digestion of the carrying medium is usually not a pure metal and requires further purification. For example, in a catalytic composite containin 0.6% platinum and approximately 99.4% alumina, by the prior methods approximately 99.4% of the material must be digested in order to recover the 0.6% of the platinum.

Other prior practices for the recovery of metals have included the use of strong acids to dissolve the metal followed by recovery of the metal from the acid solution. When the metal is a noble metal, aqua regia has been used for this purpose. However, this practice has the disadvantage of dissolving large amounts of the metal oxide when the noble metal is in association with the metal oxide. For example, when platinum is associated with alumina, and the catalytic composite is contacted with aqua regia, the platinum is dissolved; however, large amounts of alumina are also dissolved in the aqua regia. In many cases it is desirable to separate the noble metal from the oxide and in other cases it is desirable to recover or remove the noble metal from the metal oxide without destroying the physical characteristics of the metal oxide, but these objectives cannot be accomplished by the prior art practice of using aqua regia. The present invention offers a novel method of accomplishing these objectives. The present specification will be particularly directed to the recovery of noble metals, specifically platinum, with the understanding that the method may also be used for the recovery of other metals, although not necessarily with equivalent results.

It is an object of the present invention to recover a noble metal from composites containing the same more rapidly and more economically than heretofore has been possible.

It is a specific object of the present invention to recover platinum from a platinum-containing catalyst in such a manner that the physical characteristics of the inorganic oxide support are not substantially changed.

Noble metals find particular utility for use as catalysts for the conversion of organic compounds and particularly hydrocarbons. The noble metal preferably is in association with a refractory inorganic metal oxide, generally in the form of particles of uniform or irregular size and shape. The most common type of shaped particles are spheres and cylindrical pellets formed by dropping, pelleting or extrusion methods. After prolonged use in the conversion process, the catalyst usually loses its activity and it is necessary to subject the catalyst to suitable treatment in order to restore the activity thereof. In one embodiment the present invention offers a novel method of restoring the activity of used catalysts by treatment in the manner to be hereinafter set forth to dissolve the platinum without dissolving the metal oxide to a substantial extent. The metal oxide recovered in this manner is preferably reimpregnated with the noble metal for use as a catalyst. The present invention also provides a novel method of purifying alumina contaminated with metals and carbonaceous deposits.

In one embodiment the present invention relates to a method of recovering a noble metal from a composite containing a noble metal and carbonaceous deposits which comprises calcining said composite in the presence of an oxygen-containing gas to burn off said carbonaceous deposits and treating the calcined composite with aluminum chloride vapors.

In another embodiment the present invention relates to a method of reactivating an alumina-platinum composite containing carbonaceous deposits which comprises calcining said composite in the presence of air at a temperature within the range of from about 700° F. to about 1600° F. to burn off said carbonaceous deposits, treating the resultant composite with gaseous aluminum chloride at an elevated temperature thereby removing a substantial portion of the platinum therefrom without dissolving alumina to a substantial extent, separating the gases from the alumina and thereafter reimpregnating said alumina with further quantities of platinum.

In a specific embodiment the present invention relates to a method of recovering platinum from a composite comprising alumina, plutinum, and carbonaceous deposits which comprises calcining said composite in the presence of air at a temperature within the range of from about 700° F. to about 1600° F. to burn off said carbonaceous deposits, introducing the resultant composite to a magnetic separation zone wherein substances having magnetic properties are removed from said resultant composite, introducing the platinum-containing composite from said magnetic separation zone to a water washing zone wherein said composite is contacted with water, passing the water washed composite to a drying zone wherein said composite is dried at a temperature within the range of from about 200° F. to about 1600° F., passing the dried composite to a stripping zone and therein contacting said composite with aluminum chloride vapors at a temperature within the range of from 200° F. to about 1600° F., separately withdrawing vapors and alumina particles from said stripping zone, introducing the withdrawn vapors to a scrubbing zone wherein said vapors are contacted with water thereby forming an aqueous solution of a platinum compound, treating said solution with a reducing agent thereby precipitating platinum metal and recovering platinum metal from the reaction mixture.

The noble metals for recovery in accordance with the present invention include platinum, palladium, gold, silver, iridium, rhodium, ruthenium, osmium, etc. As hereinbefore set forth, these noble metals are generally associated with a metal oxide and particularly a refractory inorganic metal oxide of a metal in the left-hand columns of groups III to VIII of the periodic table including particularly the oxides of aluminum, titanium, zirconium, hafnium, thorium, vanadium, tantalum, antimony, chromium, molybdenum, tungsten, uranium, manganese, cobalt, nickel, etc. It is understood that the catalyst may comprise one or more noble metals and one or more metal oxides. In still other cases, one or more activating components may be included in the catalyst. These activating components generally are acidic and include halides, particularly chlorides and fluorides, other mineral acids, organic acids, etc.; the acidic component or components probably being associated with the refractory inorganic metal oxide and/or metal in a combined state.

As hereinbefore set forth, the composite of a noble metal or metals with a metal oxide or metal oxides is particularly suitable for use as a catalyst for effecting reactions of organic compounds and particularly hydrocarbons including such reactions as hydrogenation, dehydrogenation, cyclization, dehydrocyclization, desulfurization, hydrocracking, reforming, oxidation, etc. These reactions are well known and described in the prior art and the operating conditions such as temperature, pressure, etc. required are described in detail therein.

The novel features of the present invention are particularly adaptable to the reactivation of alumina-platinum group metal catalysts and specifically alumina-platinum-combined halogen catalysts which recently have been found to be of particular advantage for use in the reforming of gasoline. During the reforming operation or during other hydrocarbon conversion processes the catalyst is usually contaminated with carbonaceous deposits formed in the reforming process. The carbonaceous deposits may be removed from the catalyst by burning in air at a temperature of from about 700° F. to about 1600° F. for a period of from about one to twelve hours or more and this burning operation is preferably effected before the catalyst composite is treated with the aluminum chloride vapors in the manner herein set forth. In the interest of simplicity, the following description will be directed primarily to the reactivation of a catalyst comprising alumina and platinum, with the understanding that the novel features of the invention may be applied to other noble metals and other catalyst compositions. For example, using the method of this invention platinum may be stripped from composites such as alumina-platinum, alumina-platinum-combined halogen, alumina-silica-platinum, silica-platinum, magnesia-platinum, charcoal-platinum, etc.

After the burning operation, to remove a substantial amount of the carbonaceous matter on the catalyst, the catalyst may be contacted with aluminum chloride vapors. The catalyst after the burning operation however frequently contains iron dust which is not removed in the burning zone. The iron dust that is in contact with the catalyst particles results from the corrosion or erosion of the process equipment and the catalyst bed acts as a filter thereby depositing the iron dust in the catalyst bed. The iron is frequently originally deposited as iron sulfide in the catalyst bed; however, after the oxidation in the burning zone, the iron sulfide is converted to iron oxide. The iron oxide when rapidly cooled has magnetic properties and a substantial amount of the iron oxide may be removed by subjecting the catalyst particles to contact with a magnetic field. The magnetic iron oxide particles adhere to the magnetic surface while the catalyst particles do not and, therefore, a separation may be easily effected by suitable mechanical means. In another method of magnetic separation, the magnetic particles are deflected by a magnetic field while the catalyst particles are not and this deflection may be used to separate the iron from the catalyst.

The catalyst particles removed from the magnetic separation zone may now be contacted with aluminum chloride vapors, however we have discovered that a purer platinum is obtained and further that a cleaner catalyst base is obtained, when the catalyst particles from the magnetic separation zone are contacted or treated with a suitable wash solution. The washing operation, therefore, is a preferred embodiment of this invention. Any suitable method of washing may be used, which includes concurrent washing and countercurrent washing operations, batch operations in which the catalyst particles and wash solution are agitated, sluicing operations, etc. The washing operation is for the purpose of removing soluble and/or insoluble particles and impurities from the catalyst both by solution and by suspension of these extraneous materials. The washing is preferably done after the burning operation to remove the carbonaceous material since we have found that generally the washing operation after the oxidation removes more of the undesirable constituents and thus a purer product is produced. Any suitable wash solution may be used. Water is a particularly preferred wash medium and it has been found that the water removes substantial amounts of iron from the catalyst. An organic and/or inorganic acid may also be added to the wash solution, for example acetic acid, nitric acid, phosphoric acid, sulfuric acid, hydrochloric acid, etc. In some instances a base such as sodium hydroxide, ammonium hydroxide, etc. may be added to the wash solution. While water is a particularly preferred wash medium other solvents such as acetone, chloroform, ether, carbon tetrachloride, alcohol, etc. may be used. One or more of the aforementioned washing mediums may also be used in the washing zone. When water is used as the washing medium a surface active agent, such as a detergent, may be added to the water to improve the wetting of the particles, the removal of the soluble materials, and the suspension of insoluble materials.

The effluent from the washing zone, that is the washed catalyst particles, may now be introduced to the stripping zone wherein the catalyst is contacted with aluminum chloride vapors. However, it is preferred to dry the catalyst particles before stripping the same with the aluminum chloride vapors and the drying is done at a temperature within the range of from about 200° F. to about 1600° F. and preferably within the range of from about 400° F. to about 1000° F. The removal of water from the catalyst particles is preferred since the platinum is more easily stripped from a dry catalyst and, further, when water is present in the stripping zone, the water appears to react with the aluminum chloride and/or the catalyst carrier or base and forms insoluble deposits in the stripping zone. Air may be used as a drying gas or in some instances dry $Cl_2$, $CO$, $CO_2$, etc. may be used as the drying gas.

After the drying operation, the catalyst particles are introduced into a stripping zone wherein the catalyst particles are contacted with aluminum chloride vapors. It is an essential part of the invention that the platinum-containing composite be contacted with aluminum chloride vapors. The platinum is thereby removed or stripped from the other catalyst constituents. A vapor stream is removed and the platinum appears in this vapor stream. For example, an alumina-platinum composite may be treated by continuously passing aluminum chloride vapors over the alumina-platinum composite in a confined treating zone. The effluent vapors are collected and the platinum recovered from these effluent vapors. The alumina recovered is also in a very pure state. In another embodiment the alumina-platinum composite may be mixed with solid aluminum chloride, the mixture placed in a confined heating zone and then heated to vaporize the aluminum chloride. The effluent gases from this zone will also contain platinum. In another embodiment the alumina-platinum composite may be mixed with an aqueous solution of aluminum chloride, the mixture placed in a confined heating zone and then heated. The water evaporates and the aluminum chloride vaporizes. The effluent gases from this zone contain platinum. In still another embodiment the alumina-platinum composite is treated with a reactant which reacts with the alumina carrier to form aluminum chloride and it is these aluminum chloride vapors which are formed in situ which strip the platinum from the carrier. For example, an alumina-platinum composite may have the platinum stripped therefrom by placing the composite in a confined treating zone and passing phosphorus pentachloride vapors into contact with the composite. The phosphorus pentachloride reacts with the alumina to form aluminum chloride. The aluminum chloride vapors are the actual stripping medium. Therefore, when alumina is part of the composite a volatile chlorine-containing substance reactable with the alumina and capable of forming aluminum chloride by reaction with said alumina may be used.

The exact method whereby the aluminum chloride vapors remove the platinum from the platinum-containing vapors is not definitely known. It appears that the aluminum chloride, either as $AlCl_3$ or $Al_2Cl_6$ enters into some sort of a chemical combination or physical association with one or more platinum compounds to form a volatile platinum compound which is withdrawn with the rest of the effluent gases. It also appears that the platinum preferably is in a chlorinated or oxidized form before it will be volatilized by the aluminum chloride. The chlorination of the platinum may be done before the platinum-containing composite is contacted with the aluminum chloride vapors or the chlorination may be accomplished simultaneously with the stripping by the aluminum chloride. When the platinum is in the oxidized form in the platinum-alumina composite it may be converted to the chloride form by contact with aluminum chloride, however it is preferred that there be some moisture, that is water, in the system to aid in this reaction, that is the converting of the platinum oxide to the platinum chloride.

One of the basic steps of the process therefore is contacting the platinum-containing composite with aluminum chloride vapors and then separating the gases from contact with the reactant mixture, that is from contact with the remaining solids. The gases separated from the reactant mixture will contain aluminum chloride vapors as well as the volatile compound or complex of platinum.

The contact of the aluminum chloride vapors or aluminum chloride gas is effected at an elevated temperature and preferably at a temperature within the range of from about 200° F. to about 1600° F. and preferably from about 700° F. to about 1100° F. Pure aluminum chloride vapors may be used, or the vapors may be diluted with an inert carrier gas such as $He$, $N_2$, $Cl_2$, $CO_2$, air, $CO$, etc. It is preferable that this carrier gas does not react with any of the constituents in the reaction zone. Oxygen appears to react with the aluminum chloride vapors to form deposits of aluminum oxychloride and, therefore, oxygen should not be used as a carrier gas and, in fact, it should not even be present in small quantities. To eliminate oxygen from the stripping zone a bed of a reducing agent, such as a high surface area, high purity charcoal may be used at the entrance to the stripping zone. Hydrogen and hydrogen containing gaseous compounds such as $HCl$, $CH_4$, etc. are not desirable stripping gases since they appear to react with the catalyst at stripping conditions.

The contact is for a time sufficient to convert a substantial amount of the platinum in the composite to the volatile form. The exact time is of course dependent upon the temperature, reactant concentration, etc.

After the contact the gases are removed from the reactant mixture. The gases will contain the volatile platinum compound and/or complex and usually will contain large amounts of excess aluminum chloride and carrier or diluent gases if used. The gases may be collected by passing them through water to absorb them, thereby forming an aqueous solution of aluminum chloride and platinum compound, which compound is probably platinum chloride. It appears that the volatile complex or compound of platinum is not stable at lower temperatures and a platinum compound, probably platinum chloride, may be deposited by contacting the effluent gas stream with a cool surface, that is a surface below about 200° F. The compound or complex also appears to disassociate when contacted with water, and there are indications that when the effluent vapors are collected in water that the water contains platinum chloride.

While water is a particularly suitable scrubbing medium, other solutions such as concentrated aluminum chloride water solution, a water solution of $AlCl_3$ and $HCl$, etc. may be used to form a solution of platinum compound. The platinum may be recovered as the metal from this solution by any of the well known methods, such as adding aluminum metal to the solution to reduce the platinum, thereby precipitating platinum metal, or hydrazine hydrate may be used as the reducing agent.

The present invention lends itself readily to a continuous type of process which may be of the concurrent or of the countercurrent type. For example the countercurrent type of process may be effected by depositing the spent catalytic composite on a slowly moving conveyor in an enclosed space and countercurrently contacting the material with the aluminum chloride-containing gases, removing and recovering the effluent gases. The process of the present invention may also be effected batch-wise in substantially the same manner. One manner of batch-wise operation may be accomplished by depositing the catalytic material on a screen and passing the aluminum chloride vapors into contact with the material after which time the gases are separated and the platinum recovered from the gases as hereinbefore specified. The reaction rate of either a continuous or batch-wise process may be controlled by regulating the time of contact of the gases with the catalytic material, temperature, concentration of the gases, etc. The process may also be effected in a stage-wise concurrent or countercurrent manner.

Besides the use of aluminum chloride for stripping the noble metal from the catalytic composite, other volatile halides such as Friedel-Crafts halides, ferric chloride, tin chloride, boron trifluoride, etc. may be used however not necessarily with equivalent results.

The aluminum chloride vapors which are used for the stripping operation may be prepared in any suitable manner. As hereinbefore mentioned, the aluminum chloride vapors may be prepared by heating aluminum chloride. Aluminum chloride vapors may also be formed by passing chlorine gas over hot aluminum metal. Aluminum chloride vapors may also be prepared by contacting alumina with a carbon monoxide-chlorine gas mixture. Aluminum chloride vapors are also formed by reacting carbon tetrachloride vapors with alumina at an elevated temperature. Aluminum chloride vapors may also be prepared by contacting a mixture of carbon and alumina with chlorine gas at an elevated temperature.

The accompanying drawing is a schematic flow diagram of one method of conducting our process although obviously it is not intended to limit the invention thereby.

Referring now to the drawing a carbonized catalyst containing alumina, 0.5% platinum, and 1.0% carbon is introduced by way of line 1 into catalyst hopper 2. Catalyst is withdrawn through line 3 and introduced to screening zone 4 wherein a mechanical separation, usually a screening operation, is performed on the catalyst and finely divided material or fines are removed through line 5. The larger catalyst particles are withdrawn from screening zone 4 through line 6 and introduced into burning zone 7.

Burning zone 7 may be a conveyor type of apparatus in which the catalyst particles are placed on a moving wire screen and slowly passed through a furnace or other type of heater. Air is introduced for the conversion through line 8 and exit gases are withdrawn through line 9. The temperature in the burning zone is approximately 1100° F. At this temperature and in the presence of air the carbon is reduced to below about 0.05% by weight.

The oxidized or calcined catalyst particles are withdrawn from burning zone 7 through line 10 and introduced into magnetic separation zone 11. In magnetic separation zone 11 the catalyst particles are contacted with a magnetic surface and magnetic iron particles adhere to this surface and are removed through line 12. The catalyst particles that are now substantially free of magnetic material are withdrawn through line 13 and introduced to water washing zone 14.

Water washing zone 14 may be any conventional type of water washing zone and in the drawing there is indicated an up-flow operation with the catalyst particles descending through a stream of ascending water. The water is introduced to zone 14 through line 15 and exit water is removed through line 16. Soluble materials, which comprise chiefly soluble iron compounds and other metallic compounds are removed through line 16 and also finely divided iron particles which are removed from the catalyst surface are withdrawn as a finely divided suspension.

The washed particles are withdrawn through line 17 and introduced to drying zone 18. Drying zone 18 is maintained at approximately 500° F. Drying gases, which in this illustrated embodiment comprises air, are introduced through line 19 and the exit gases containing the water vapor are withdrawn through line 20. The dried particles are removed through line 21 and introduced into stripping zone 22.

Stripping zone 22 is a confined zone wherein the catalyst particles may be readily contacted with aluminum chloride vapors. Aluminum chloride vapors are introduced through line 23 and are carried into stripping zone 22 by a stream of nitrogen. The stripping zone is maintained at approximately 1100° F. Substantially pure alumina spheres are withdrawn through line 25. The effluent gases which comprise nitrogen, aluminum chloride, and volatile platinum compound or complex vapors are withdrawn through line 24 and introduced into scrubbing zone 26.

Scrubbing zone 26 is herein illustrated as a countercurrent scrubbing apparatus in which the gas is contacted with a descending stream of water introduced through line 27. Nitrogen is removed from the top of the stripping zone through line 28. A water solution comprising water, platinum compound, and aluminum chloride is withdrawn from scrubbing zone 26 through line 29 and introduced to reducing zone 30. A reducing agent is introduced to reducing zone 30 through line 31. For example, metallic aluminum may be introduced through line 31. The metallic aluminum reduces the platinum compound and precipitates platinum from the solution. The precipitated platinum metal is removed through line 33 and the substantially platinum-free solution is withdrawn through line 32.

The following examples are introduced to further illustrate the invention however they are not introduced to unduly limit the same.

EXAMPLE I

One hundred cc. of a carbonized alumina-platinum catalyst containing approximately 2% by weight of carbon and 0.4% by weight of platinum was placed in a glass tube which was situated in an electrically heated furnace. The catalyst was heated to a temperature of approximately 1100° F. and air was slowly passed through the catalyst composite. At the end of approximately thirty minutes the catalyst pellets appeared light in color and indicated the substantially complete removal of carbon from the catalyst. Four grams of aluminum chloride crystals were placed at the inlet portion of the glass tube and the entire tube heated to 1000° F. The main axis of the tube was vertical and nitrogen was passed downwardly through the tube and in this manner the vaporized aluminum chloride was passed over the catalyst particles. The nitrogen sweep was at the rate of 1000 cc. per minute. At the end of five minutes substantially all of the platinum was stripped from the catalyst bed. This example illustrates the removal of platinum by the use of aluminum chloride vapors after the removal of carbon.

EXAMPLE II

One hundred cc. of a carbonized alumina-platinum catalyst containing approximately 1.5% carbon and approximately 0.4% by weight of platinum was placed in a 30 mm. O. D. furnace tube. The tube was heated to approximately 1200° F. and air passed therethrough for approximately thirty minutes. The tube was then rapidly cooled by passing air therethrough at a high rate. The catalyst was removed from the tube and the catalyst and catalyst dust were contacted with a magnet. Substantial amounts of magnetic particles adhered to the magnet surface. An analysis showed that the magnetized particles were predominantly iron.

The catalyst was then placed in a beaker and covered with water and subjected to mild agitation with a stirring rod. The washing freed more iron compound from the catalyst surface and formed a suspension of iron dust in the water. An analysis indicated that the solution contained large amounts of iron. There were indications of other metallic compounds in the water solution. This example illustrates the benefit of the magnetic separation of magnetic particles and the benefit of water washing the calcined catalyst.

EXAMPLE III

The above catalyst after the water washing is subjected to aluminum chloride vapors. A deposit immediately forms at the exit end of the tube and tends to clog the tube.

The catalyst particles are then removed from the tube and dried in air at 500° F. for approximately thirty minutes. The catalyst is then replaced in the tube and contacted with aluminum chloride vapors. The deposits no longer form near the exit end of the tube.

This example illustrates that, when water washing is used, it is preferred to dry the catalyst particles before the aluminum chloride vapor stripping operation.

EXAMPLE IV

Seventy-five cc. of a spent reforming catalyst containing alumina and approximately 0.4% by weight of platinum was placed in a 30 mm. O. D. furnace tube. A 2 inch layer of glass beads was placed on top of the catalyst. Approximately 10 cc. of anhydrous aluminum chloride was placed on top of the glass beads. The reaction temperature, that is the temperature of the entire tube was maintained at 932° F. Nitrogen was passed downwardly, first into contact with the aluminum chloride and then into contact with the catalyst particles, thereby passing aluminum chloride vapors into contact with the catalyst. The effluent gases were bubbled through water and the platinum in the effluent gas and the aluminum chloride in the effluent gas were readily soluble in water. When a reducing agent, $SnCl_2$, was added to the solution, a qualitative test for platinum was obtained. After five minutes of the stripping operation the catalyst tube was cooled and the catalyst pills analyzed for platinum content. The analysis are given below in the table.

*Table*

Top ⅓ of catalyst bed__ 0.0058% by weight of platinum.
Middle ⅓ of catalyst bed 0.0053% by weight of platinum.
Bottom ⅓ of catalyst bed 0.0053% by weight of platinum.

The above results indicate that the platinum was substantially removed and recovered from the catalyst particles.

EXAMPLE V

Seventy-five cc. of spent reforming catalyst in the shape of spheres of approximately ⅛ inch average diameter were placed in a heater tube centrally located in an electrically heated furnace. Two cc. of glass beads were then placed on top of the catalyst spheres. The spheres contained alumina and approximately 0.4% by weight of platinum. Approximately 10 grams of phosphorus pentachloride were placed on top of the glass beads. Chlorine gas was passed downwardly, first over the phosphorus pentachloride and then into contact with the catalyst spheres. The temperature in the stripping zone was 932° F. The phosphorus pentachloride slowly volatilized and the chlorine sweep caused the phosphorus pentachloride vapors to contact the catalyst spheres. The chlorine sweep was at the rate of 500 cc. per minute and was continued for five minutes. The effluent gases were condensed and analyzed and indicated platinum as well as aluminum chloride. The phosphorus pentachloride therefore reacted with the alumina to form aluminum chloride, and the aluminum chloride in turn stripped the platinum from the catalyst. At the end of the stripping operation the platinum was almost completely removed from the catalyst spheres. This example illustrates that when an alumina base catalyst is used, then a stripping gas may be used which reacts with the alumina to form aluminum chloride which is the actual volatilizing agent or stripping agent.

The experiment was repeated however this time a platinum-silica composite was used. Phosphorus pentachloride did not remove the platinum from this composite. This additional experiment confirms the fact that it is aluminum chloride which is the stripping agent.

EXAMPLE VI

An alumina-palladium composite was placed in a heater tube and heated to approximately 900° F. Chlorine was passed over the catalyst at the rate of 700 cc. per minute. No palladium appeared in the exit gas. Five grams of anhydrous aluminum chloride was then placed at the inlet and the chlorine sweep continued at the rate of 700 cc. per minute. Immediately, palladium appeared in the effluent gas and after approximately five minutes substantially all of the palladium was removed from the palladium-alumina composite. This example illustrates that other noble metals besides platinum may be removed by stripping with aluminum chloride.

We claim as our invention:

1. A method of recovering platinum from an alumina-platinum composite containing carbonaceous deposits which comprises calcining said composite in the presence of air at a temperature within the range of from about 700° F. to about 1600° F. to burn off said carbonaceous deposits, treating the resultant composite with gaseous aluminum chloride at a temperature within the range of from about 200° F. to about 1600° F. thereby removing a substantial portion of the platinum therefrom without dissolving alumina to a substantial extent, separating the gases from the alumina and scrubbing the separated gases with water to form an aqueous solution of a platinum compound and aluminum chloride, adding a reducing agent to said solution to precipitate platinum metal therefrom and recovering the precipitated platinum metal.

2. The method of claim 1 further characterized in that said reducing agent comprises aluminum metal.

3. The method of claim 1 further characterized in that said reducing agent comprises hydrazine hydrate.

4. The method of claim 1 further characterized in that said reducing agent comprises $SnCl_2$.

5. A method of recovering platinum from a composite comprising alumina, platinum, and carbonaceous deposits which comprises calcining said composite in the presence of air at a temperature within the range of from about 700° F. to about 1600° F. to burn off said carbonaceous deposits, introducing the resultant composite to a magnetic separation zone wherein substances having magnetic properties are removed from said resultant composite, introducing the platinum-containing composite from said magnetic separation zone to a water washing zone wherein said composite is contacted with water, passing the water washed composite to a drying zone wherein said composite is dried at a temperature within the range of from about 200° F. to about 1600° F., passing the dried composite to a stripping zone and therein contacting said composite with aluminum chloride vapors at a temperature within the range of from about 200° F. to about 1600° F., separately withdrawing vapors and alumina particles from said stripping zone, introducing the withdrawn vapors to a scrubbing zone wherein said vapors are contacted with water thereby forming an aqueous solution of a platinum compound, treating said solution with a reducing agent thereby precipitating platinum metal and recovering platinum metal from the reaction mixture.

References Cited in the file of this patent

UNITED STATES PATENTS

| | | |
|---|---|---|
| 1,876,943 | Hull | Sept. 13, 1932 |
| 2,488,744 | Snyder | Nov. 22, 1949 |
| 2,607,675 | Gross | Aug. 19, 1952 |
| 2,635,080 | Appell | Apr. 14, 1953 |
| 2,785,138 | Milliken | Mar. 12, 1957 |